M. L. SENDERLING.
Trucks.
No. 135,247.  Patented Jan. 28, 1873.
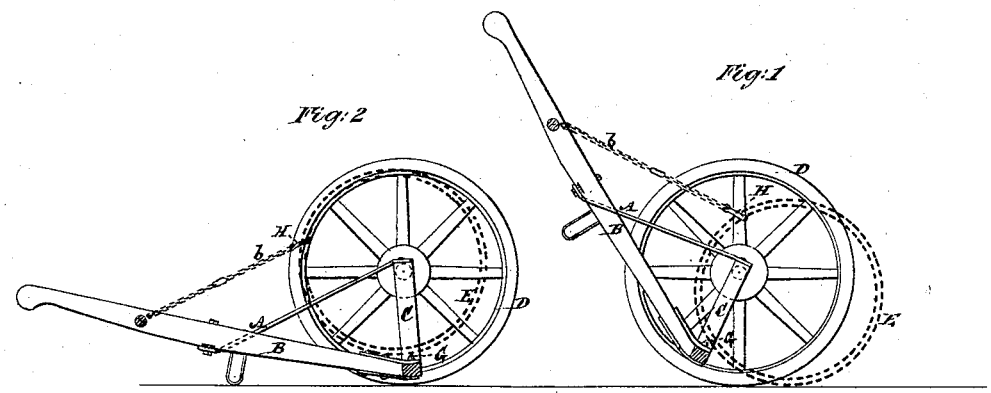
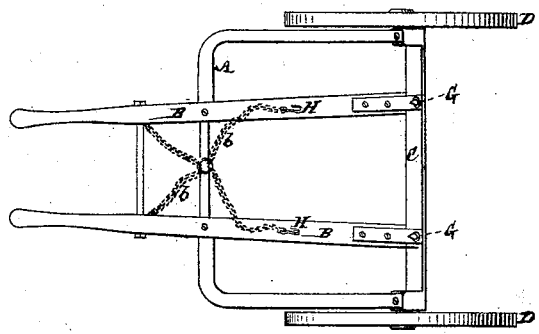

UNITED STATES PATENT OFFICE.

MARTIN L. SENDERLING, OF JERSEY CITY, NEW JERSEY.

IMPROVEMENT IN TRUCKS.

Specification forming part of Letters Patent No. 135,247, dated January 28, 1873.

*To all whom it may concern:*

Be it known that I, MARTIN L. SENDERLING, of Jersey City, in the county of Hudson and State of New Jersey, have invented an Improvement in Trucks for transporting casks, boxes, or cases and other packages, of which the following is a specification:

This invention relates to trucks mainly designed for transporting heavy packages of various kinds, including casks, boxes, or cases, and has especial reference to trucks for such purposes in which the axle is bent down in a crank-like shape nearly close to the ground, to allow of the cask being run in between the wheels on narrow runners connected with the cranked portion of the axle in order to facilitate the loading of the truck without the necessity of raising the cask to any considerable height from the ground, as described in Letters Patent No. 45,643, for improvement in trucks, issued to me December 27, 1864; but this invention, which is mainly designed for hand use, but may be used for draft by animal-power, essentially differs from my previous invention, as just referred to, in dispensing with a windlass or mechanism for drawing and holding the cask or package to its place on the truck, and in generally simplifying the construction of the latter or its attachments, and in making the truck lighter to handle.

The invention consists in a combination, with the cranked axle of the truck, arranged in relation with the ground, as described, of cant-hooks connected by chains with the shafts or forward portion of the frame, and pointed or other retainers in the rear, said devices being so arranged that on raising the forward portion of the frame and hitching the cant-hooks onto the cask or package, and then lowering said portion of the frame, the cask or package is rolled or lifted and drawn up onto the runners in proper relation with the cranked axle, and is caught or retained in place by the pointed or other retainers in the rear.

In the accompanying drawing which forms part of this specification, Figures 1 and 2 represent a truck constructed in accordance with my invention, in positions for lifting and drawing a cask onto the runners, and when said cask is in its place on the truck ready to be removed or hauled away. Fig. 3 is a plan of the truck with its attachments, having the cask, which is shown by dotted lines in Figs. 1 and 2, omitted.

Similar letters of reference indicate corresponding parts.

A is the frame of the truck, open at its rear end, and B B the shafts forming part of or connected with said frame. C is the cranked axle, with the lower portion of which the shafts B B are connected in their rear to form runners. D D are the main or running wheels, fitted loosely upon the upper extremities of the cranked axle. E is a cask, designed to be removed by the truck. Arranged to project upward from the rear ends of the shafts B B, preferably immediately over the bent lower portion of the axle C, are pointed or other retainers, G G, which hold the cask to its place after the same has been lifted and drawn or rolled to its place thereon in suitable relation with the axle to balance the load, or nearly so. These retainers also assist in lifting or adjusting the cask to its place, but are not the prime agents for such purpose. The devices for lifting and drawing or rolling the cask to its place on the truck or its runners formed by the shafts B B consist of cant-hooks H H, attached by chains $b\ b$ to the frame in front or forward portion of the shafts, and which may be provided with a hook and links for taking up or letting out the cant-hooks to suit different sized casks or packages.

To lift the cask and draw or roll it to its place on the truck, the latter is run back and raised in front, as represented in Fig. 1 of the drawing, so as to cause its runners or rear ends of the shafts B B to pass partly under the cask E, when the cant-hooks H H are hitched onto the cask at its ends and the shafts B B lowered in front, as represented in Fig. 2, which causes the casks to be lifted and drawn or rolled up on the runners or shafts to a position more or less within the main or running wheels D D—that is, over the lower cranked portion of the axle—and so that the retainers G G dig into or catch against and under the after portion of the cask to retain it in place on the truck. In this way or by these means the shafts themselves form levers for lifting the cask by the cant-hooks and for adjusting it to its place on the truck, the retainers G G assisting and holding the cask to its place over the bent lower portion of the axle. When it is required to run off the cask from the truck it is only necessary to raise the front ends of the shafts B B and to liberate the cant-hooks H H.

What is here claimed, and desired to be secured by Letters Patent, is—

The combination of the cant-hooks H and one or more back-retainers, G, with the bent or cranked axle C, the shafts or runners B B, the main wheels D D, and the frame A, open in the rear of the truck, substantially as specified.

MARTIN L. SENDERLING.

Witnesses:
MICHAEL RYAN,
FRED. HAYNES.